(12) United States Patent
Choi et al.

(10) Patent No.: US 9,223,422 B2
(45) Date of Patent: Dec. 29, 2015

(54) REMOTE CONTROLLER AND DISPLAY APPARATUS, CONTROL METHOD THEREOF

(71) Applicant: SAMSUNG ELECTRONICS CO., LTD., Suwon-si (KR)

(72) Inventors: Eun-seok Choi, Anyang-si (KR); Jong-bo Moon, Suwon-si (KR); Mi-ra Yu, Seoul (KR); Sang-on Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 14/078,348

(22) Filed: Nov. 12, 2013

(65) Prior Publication Data

US 2014/0139433 A1    May 22, 2014

(30) Foreign Application Priority Data

Nov. 12, 2012  (KR) .................. 10-2012-0127610

(51) Int. Cl.
| | |
|---|---|
| *G06F 3/033* | (2013.01) |
| *G06F 3/038* | (2013.01) |
| *G06F 3/01* | (2006.01) |
| *G06F 3/0484* | (2013.01) |
| *G06F 3/0346* | (2013.01) |

(52) U.S. Cl.
CPC .............. *G06F 3/0383* (2013.01); *G06F 3/017* (2013.01); *G06F 3/0346* (2013.01); *G06F 3/0484* (2013.01); *G06F 3/04842* (2013.01); *G06F 2203/0334* (2013.01)

(58) Field of Classification Search
CPC ........... G06F 3/02; G06F 3/033; G06F 3/041; G06F 3/045; G06F 3/048; G09G 5/08; G09G 5/00

USPC ........... 345/156, 158, 169, 419; 715/856, 863
See application file for complete search history.

(56) References Cited

U.S. PATENT DOCUMENTS

| | | | |
|---|---|---|---|
| 8,462,011 B2 | 6/2013 | Yun | |
| 2009/0072992 A1 | 3/2009 | Yun | |
| 2010/0225580 A1 | 9/2010 | Yoon et al. | |
| 2010/0302151 A1* | 12/2010 | Bae et al. | 345/158 |
| 2013/0002576 A1* | 1/2013 | Kim et al. | 345/173 |
| 2013/0057465 A1* | 3/2013 | Lee et al. | 345/156 |
| 2013/0131474 A1* | 5/2013 | Gu et al. | 600/324 |

(Continued)

FOREIGN PATENT DOCUMENTS

| | | |
|---|---|---|
| JP | 2006-268297 A | 10/2006 |
| KR | 10-2009-0030163 A | 3/2009 |

(Continued)

OTHER PUBLICATIONS

International Search Report for PCT/KR2013/010197 dated Feb. 18, 2014 [PCT/ISA/210].

(Continued)

*Primary Examiner* — Pegeman Karimi
(74) *Attorney, Agent, or Firm* — Sughrue Mion, PLLC

(57) ABSTRACT

A remote controller includes a communicator configured to perform communication with a display apparatus which provides a user interface screen, a sensor configured to sense a movement of the remote controller, and a controller configured to control so that, when a preset event occurs, motion information of the remote controller as sensed at the sensor is mapped with a reference point of a pointer provided on the user interface screen.

17 Claims, 10 Drawing Sheets

(56) References Cited

U.S. PATENT DOCUMENTS

| | | | |
|---|---|---|---|
| 2013/0181899 A1* | 7/2013 | Yun | 345/158 |
| 2013/0342456 A1* | 12/2013 | Choi et al. | 345/158 |
| 2014/0104156 A1* | 4/2014 | Touma et al. | 345/156 |

FOREIGN PATENT DOCUMENTS

| KR | 10-2010-0002465 A | 1/2010 |
|---|---|---|
| KR | 10-2010-0091854 A | 8/2010 |
| KR | 10-2010-0100305 A | 9/2010 |

OTHER PUBLICATIONS

Written Opinion for PCT/KR2013/010197 dated Feb. 18, 2014 [PCT/ISA/237].

* cited by examiner (a)

(b)

(a)

(b)

(c)

(a)

(b)

REMOTE CONTROLLER AND DISPLAY APPARATUS, CONTROL METHOD THEREOF

BACKGROUND OF THE INVENTION

1. Field of the Invention

Controllers, apparatuses and methods consistent with what is disclosed herein relate to a remote controller, a display apparatus and a control method thereof, and more particularly, to a remote controller for controlling a display apparatus, a display apparatus, and a control method thereof.

2. Description of the Related Art

Advancement in the electronic technologies demands ways to control electronic apparatuses in more diversified manners. A related controlling manner uses buttons on the electronic apparatus or a separate device such as a remote controller to control the electronic apparatus.

However, the related controlling manner of using a separate device from the electronic apparatus such as remote controller suffers shortcoming that a user is required to press buttons on the remote controller to implement the operation he intends.

For example, in an example where the a pointer displayed on a screen of the electronic apparatus is used, a user can select specific content only after he moves the pointer to a corresponding content area where the user wants to select the specific content, by selecting buttons of four directions, and selects the intended content by pressing a select button provided on the remote controller. Therefore, it is quite inconvenient for the user because he can finally select the intended content after checking and pressing buttons provided on the remote controller several times.

Accordingly, method is necessary, which enables a user at remote distance to search the information displayed on the screen of the electronic apparatus with increased convenience.

SUMMARY OF THE INVENTION

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide a remote controller configured to control a display apparatus in response to a movement as sensed, a display apparatus, and a control method thereof.

In one embodiment, a remote controller is provided, which may include a communicator configured to perform communication with a display apparatus which provides a user interface screen, a sensor configured to sense a movement of the remote controller, and a controller configured to control so that, when a preset event occurs, motion information of the remote controller as sensed at the sensor is mapped with a reference point of a pointer provided on the user interface screen.

The controller may control so that a reference angle is set based on angle information of the remote controller as sensed at the sensor at the time the event occurs, and the pointer is placed on the reference point on the user interface screen.

The controller may control so that once the pointer is placed on the reference point on the user interface screen, the pointer is fixed on the reference point for a preset period of time.

The event may be a pre-defined gesture of the remote controller.

The remote controller may additionally include a button, wherein the event comprises a double tap or a rubbing on the button.

The button may be configured in such a form that the button comprises at least one of a touch sensor and an optical Joystick which utilizes optical technology.

The button may additionally include a physical button configured to receive a user command to select an object at which the pointer is placed in the pointing mode.

The sensor may include at least one of an accelerometer, a gyro sensor and a geomagnetic sensor.

The pointer may be provided in an absolute pointing manner in which absolute coordinate is estimated based on the movement of the remote controller.

In one embodiment, a display apparatus controlled by a remote controller is provided, which may include a communicator configured to communicate with the remote controller, a display configured to display a pointer which provides an indicating function on a user interface screen, and a controller configured to control so that when a user command to set a reference point of the pointer is received from the remote controller, the pointer is placed on the reference point on the user interface screen.

In another embodiment, a control method of a remote controller is provided, which may include performing communication with a display apparatus which provides a user interface screen, and when a preset event occurs, controlling so that motion information of the remote controller as sensed at the sensor is mapped with a reference point of a pointer provided on the user interface screen.

The controlling may include controlling so that a reference angle is set based on angle information of the remote controller as sensed at the sensor at the time the event occurs, and the pointer is placed on the reference point on the user interface screen.

The controlling may include controlling so that once the pointer is placed on the reference point on the user interface screen, the pointer is fixed on the reference point for a preset period of time.

The event may be a pre-defined gesture of the remote controller.

The event may include a double tap or a rubbing on a button provided on the remote controller.

The button may be configured in such a form that the button comprises at least one of a touch sensor and an optical Joystick which utilizes optical technology.

The button may additionally include a physical button configured to receive a user command to select an object at which the pointer is placed in the pointing mode.

The controlling may include sensing the movement of the remote controller using at least one of an accelerometer, a gyro sensor and a geomagnetic sensor.

The pointer may be provided in an absolute pointing manner in which absolute coordinate is estimated based on the movement of the remote controller.

In one embodiment, a control method of a display apparatus controlled by a remote controller is provided, which may include displaying a pointer which provides an indicating function on a user interface screen, and controlling so that when a user command to set a reference point of the pointer is received from the remote controller, the pointer is placed on the reference point on the user interface screen.

According to various embodiments, an intuitive remote control method is provided, which can provide similar interfacing as experienced in touch mode.

DESCRIPTION OF THE PREFERRED EMBODIMENT

Certain exemplary embodiments of the present inventive concept will now be described in greater detail with reference to the accompanying drawings.

Figure 1:
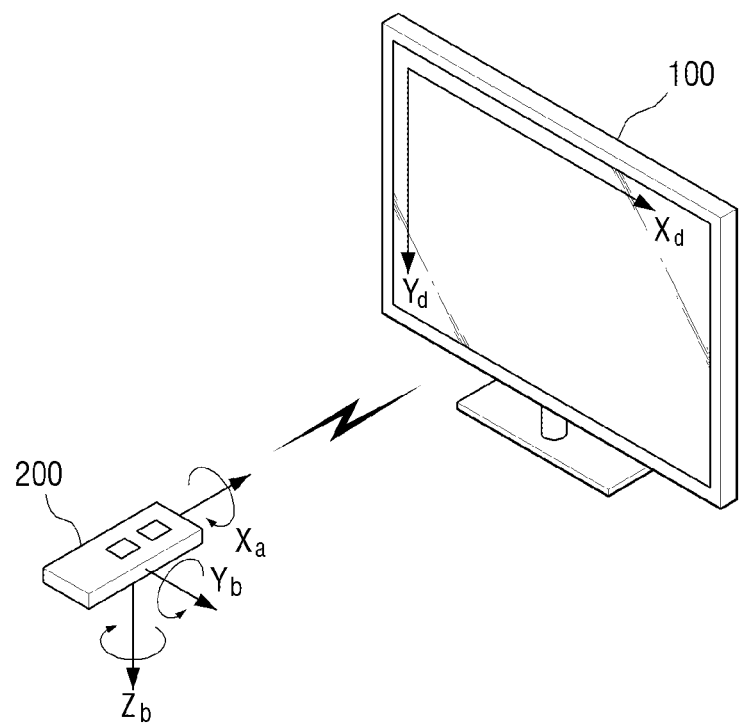
FIG. 1 illustrates a constitution of a display system according to an embodiment.

FIG. 1 illustrates a constitution of a display system according to an embodiment.

Referring to FIG. 1, the display system according to an embodiment includes a display apparatus 100 and a remote controller 200.

The display apparatus 100 may be implemented as a digital TV which is controlled by the remote controller 200 that provides a plurality of control modes, but not limited thereto. Accordingly, the display apparatus 100 maybe implemented as any remote-controllable device such as PC monitor, or the like.

The remote controller 200 is provided to remotely control the display apparatus 100, and is so configured as to receive a user command and transmit a corresponding control signal to the display apparatus 100. As used herein, the remote controller 200 may be a space mouse, a remote controller, or a mobile phone. Meanwhile, referring to FIG. 1, the remote controller 200 and the display apparatus 100 may be wireless types, but not limited thereto. Accordingly, the remote controller 200 and the display apparatus 100 may be implemented as wired types.

The remote controller 200 may sense a motion of the remote controller 200 in XYZ space, and transmit a signal regarding the three-dimensional (3D) motion o the display apparatus 100. The 3D motion may correspond to a command to control the display apparatus 100. That is, as the user moves the remote controller 200 in a space (e.g., by tilting vertically or rotating horizontally), a preset command may be transmitted to the display apparatus 100. For example, the remote controller 200 may include therein at least one of geomagnetic sensor, gyro sensor and accelerometer, to calculate at least one of the information including roll angle ($\phi$), pitch angle ($\theta$), yaw angle ($\psi$) varying in accordance with a user's motion, and transmit the calculated information to the display apparatus 100.

At this time, the remote controller 200 may transmit a corresponding signal to the sensed motion information (and direction information of geomagnetism) which is sensed depending on the location where the calculation on the sensed information is performed, or transmit a signal, which is a control command (hereinbelow, 'control information') converted from the sensed motion information to control the display 100.

Meanwhile, the remote controller 200 may provide absolute pointing method which is based on absolute coordinate system. That is, the moving area of the remote controller 200 may match the screen of the display apparatus 100. More specifically, it is possible to calculate the moving trajectories as the user moves the remote controller 200 with reference to a preset absolute reference point. For example, when the remote controller 200 tilts in the space vertically or rotates horizontally, the angle that varies depending on the motion of the remote controller 200, i.e., the absolute angle is calculated, and the pointer (e.g., mouse cursor) may be moved on the screen from point (x1, y1) to (x2, y2) according to angle of motion of the remote controller.

Meanwhile, the display apparatus 100 and the remote controller 200 may communicate in various communication manners including BlueTooth (BT), Zigbee, Wireless Fidelity (WI-FI), Infrared (IR), Serial Interface, or Universal Serial Bus (USB). For example, when the display apparatus 100 및 the remote controller 200 communicate in BlueTooth (BT) manner, the two may interoperate via BT pairing. Details for the BP pairing are already known, and detailed explanation thereof will be omitted herein for the sake of brevity.

Figure 2:
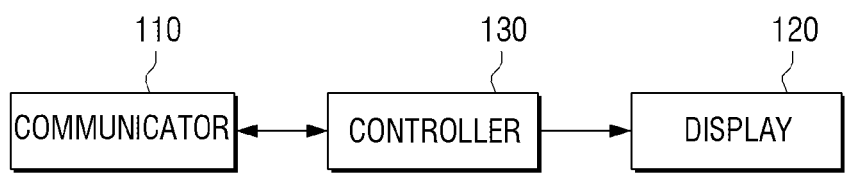
FIG. 2 is a block diagram of a display apparatus according to an embodiment.
Figure 2:
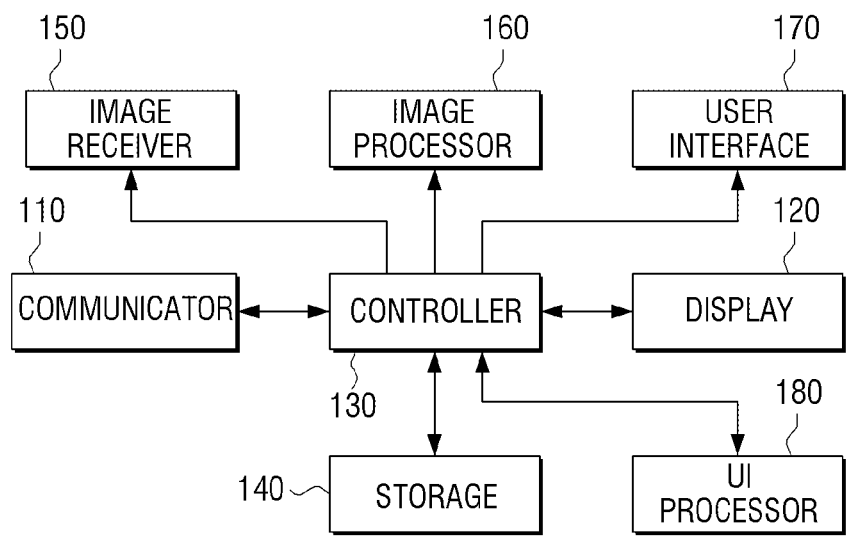

FIG. 2 is a block diagram of a display apparatus according to an embodiment.

Referring to FIG. 2(a), the display apparatus 100 includes a communicator 110, a display 120 and a controller 130.

The display apparatus 100 may be implemented as a digital TV, PC, or laptop computer, but not limited thereto. Accordingly, the display apparatus 100 may be applicable as any remote-controllable device that is equipped with display function.

The communicator 110 may communicate with the remote controller 200. To be specific, the communicator 110 may communicate with the remote controller 200 in various communication manners including BlueTooth (BT), Zigbee, Wireless Fidelity (WI-FI), IR (Infrared), Serial Interface, or Universal Serial Bus (USB).

Specifically, the communicator 110 may receive from the remote controller 200 a control signal that corresponds to a user command as inputted. The user command may be a gesture input, or button input, or voice input.

For example, it is possible to receive from the remote controller 200 a control signal that corresponds to a gesture command as sensed. Depending on embodiments, it is also possible to receive control information other than the control signal, as long as the remote controller 200 supports with sufficient computation ability.

Further, the communicator 110 may receive from the remote controller 200 a control mode shift signal, or a select signal. The control mode shift signal or select signal may be inputted via the buttons provided on the remote controller 200.

To be specific, the communicator 110 may receive from the remote controller 200 a remote control signal including information on operational modes and motion information of the remote controller 200. The 'information on operational modes' refers to various forms of information on user command that is made to select between pointing mode and gesture mode. For example, the mode information may be implemented as a flag type, in which case the flat may be '0' in pointing mode, while it is '1' in gesture mode. That is, the remote controller 200 may generate flag information indicating '0' or '1' depending on the user command inputted to change mode. The user command to select mode may be inputted through a first button (not illustrated) provided on the remote controller 200.

Further, depending on embodiments, the communicator 110 may transmit information to the remote controller 200. For example, the display apparatus 100 in power-off mode may transmit a power-off signal to the remote controller 200 so that the remote controller 200 is automatically turned to power-off mode.

The display 120 may provide a variety of display screens through the display apparatus 100.

The display 120 may particularly display various UI screens which support user interface.

Further, the display 120 may display a GUI that corresponds to a control mode of the remote controller 200 according to control of the controller 130.

To be specific, when the remote controller 200 is in pointing mode, the display 120 may display a pointer on the displayed UI screen, such as a cursor, a mouse cursor, or a highlighting. Further, the display 120 in pointing mode may move the location of the pointer and display the same, according to a control signal received from the remote controller 200. The display 120 may be implemented as a liquid crystal display, a thin film transistor-liquid crystal display, an organic light-emitting diode, a flexible display, a 3D display, or various others.

The controller 130 operates to control the overall operations of the display apparatus 100.

The controller 130 may control selecting of operation modes, based on the operational mode information received from the remote controller 200.

To be specific, the controller 130 may control selecting between pointing mode and gesture mode, based on the information on user command inputted to select one between the pointing mode and the gesture mode.

To be specific, the controller 130 may determine the operation mode of the display apparatus 100 to be the pointing mode when the information on user command to select one between the pointing mode and the gesture mode is not received, and determine the operation mode of the display apparatus 100 to be the gesture mode when the information on user command to select between the pointing mode and the gesture mode is received.

Further, the controller 130 may convert the motion information received from the remote controller 200 into a control signal to control the display apparatus 100, and control the operation of the display apparatus 100 according to the converted control signal.

The controller 130 may convert the control signal received from the remote controller 200 into control information to control the display apparatus 100, and control the display apparatus 100 according to the converted control information. To be specific, using a control information mapping table, the controller 130 may convert the received control signal into control information form that is applicable to the function of the display apparatus 100 and control the function of the display apparatus 100 using the converted control information.

The controller 130 may particularly control so that when the user command to set a reference point of the pointer is received from the remote controller, the pointer is placed at the reference point on the UI screen. The 'reference point' as used herein may be center coordinate of the screen.

Further, the controller 130 may accordingly move the pointer from the center coordinate of the screen when a signal corresponding to the movement of the remote controller 200 is received.

For example, when the center coordinate of the screen is (0, 0), the pitch angle range according to the movement of the remote controller 200 is ±θlimit, and the yaw angle range is ±ψlimit. Accordingly, in accordance with the changes in pitch angle and yaw angle of the remote controller 200, the position of the pointer is adjusted within ranges of ±θlimit, and ±ψlimit. In other words, the pointer is moved from the center coordinate on the screen, according to the motion of the remote controller 200.

Meanwhile, in another embodiment, the communicator 110 may receive a control signal generated based on mode information inputted through the remote controller 200 and the motion information of the remote controller 200. That is, unlike the embodiment explained above, the communicator 110 may receive a control signal from the remote controller 200 which is so configured as to enable controlling on the display apparatus 100 without requiring separate computations.

FIG. 2(b) is a detailed block diagram of the display apparatus of FIG. 2A.

Referring to FIG. 2(b), the display apparatus 100' includes a communicator 110, a display 120, a controller 130, a storage 140, an image receiver 150, an image processor 160, a user interface 170 and a UI processor 180. Referring to FIG. 2B, it is assumed that the display apparatus 100 of FIG. 2A is implemented as a digital TV. Further, redundant explanation about the overlapping elements between FIGS. 2A and 2B will be omitted for the sake of brevity.

The storage 140, which is a recording medium for recording various data and programs necessary for the operation of the display apparatus 100', may be implemented as a memory, or a hard disk drive (HDD).

For example, the storage 140 may match a control command corresponding to a preset gesture of the remote controller 200 and store the same. For example, the remote controller 200 may match a circle-drawing gesture to a command to set reference point and store the same.

The image receiver 150 may receive broadcast content via antenna or cable, or receive image contents from external device or external communication network.

To be specific, the image receiver 150 may receive a variety of image contents via network or air. The 'content' as used herein may refer to pre-made content such as VOD content, broadcast content, or various other types of contents.

The image receiver 150 may be implemented in a variety of forms. For example, the display apparatus 100 may be implemented as a digital TV, in which case the image receiver 110 may be implemented as a set-top box, a tuner, an external input port, or a network communication module.

The image processor 160 processes a variety of signals received through the image receiver 150. Accordingly, the image processor 160 may include signal processing element such as a demodulator, a decoder, an A/D converter, or a scaler.

The user interface 170 receives a variety of user signals.

The user interface 170 may be implemented in a variety of forms, depending on types of the display apparatus 100. For example, when the display apparatus 100 is implemented as a digital TV, the user interface 170 may be implemented as the communicator 110 that receives a remote control signal.

Alternatively, the user interface 170 may be implemented as an input panel having a plurality of keys, or a touch screen of inter-layered structure of display and touchpad.

The UI processor 180 generates a variety of UI elements which are displayed in overlapping manner on the image outputted on the display 120. The UI processor (not illustrated) may generate 2D or 3D UI element.

Further, under control of the controller 130, the UI processor 180 may perform operation such as, for example, 2D/3D conversion of UI element, transparency, color, size, shape and position adjustment, highlighting, or animation effect.

Figure 3:
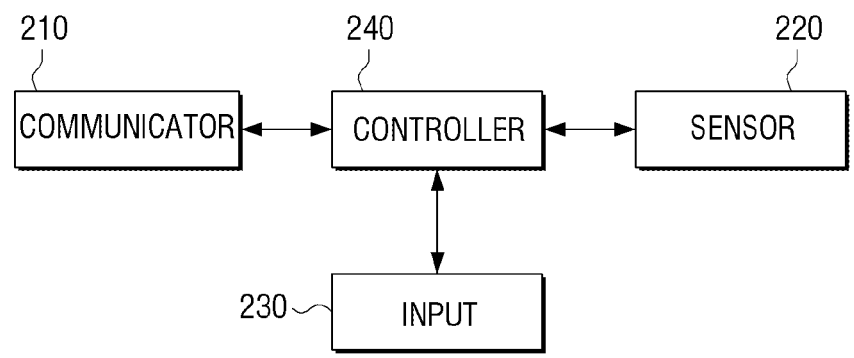
FIG. 3 is a block diagram of a remote controller according to an embodiment.

FIG. 3 is a block diagram of a remote controller according to an embodiment.

Referring to FIG. 3, the remote controller 200 includes a communicator 210, a sensor 220, an input 230 and a controller 240.

The communicator 210 communicates with the display apparatus 100 and transmits a sense signal obtained through the sensor 220 or a signal corresponding to a user command inputted through the input 230 to the display apparatus 100. To be specific, the communicator 210 may communicate with the display apparatus 100 in various communication manners including BlueTooth (BT), Zigbee, Wireless Fidelity (WI-FI), IR (Infrared), Serial Interface, Universal Serial Bus (USB), or NFC (Near Field Communication).

The sensor 220 senses three-dimensional movement of the remote controller 200. To be specific, the sensor 220 may include at least one of accelerometer, gyro sensor, and geomagnetic sensor. The sensors of the sensor 220 may operate in combination with one or more of the other sensors to sense 3D movement of the remote controller 200.

The accelerometer measures the spatial movement of the remote controller 200. That is, the accelerometer may sense at least one of the acceleration change and angular acceleration change that occur when the user moves the remote controller 200. The accelerometer may be implemented as three-axis accelerometer to measure increment and decrement of linear velocity with respect to three axes orthogonal to each other. Accordingly, using the accelerometer, it is possible to use acceleration of the remote controller 200 which is moving and also acceleration of gravity of the remote controller 200 in motionless state, to thus obtain information about tilting.

The gyro sensor is an inertial sensor which measures rotational angular velocity of the remote controller 200. That is, the gyro sensor can obtain direction and velocity of rotation, using the inertial force of a rotating object. The gyro sensor may be implemented as a three-axis angular velocity sensor which measures increase and decrease of rotation angle with respect to three axes orthogonal to each other.

The geomagnetic sensor measures azimuth. The geomagnetic sensor 106 senses magnetic field formed to north-south direction of the earth, to measure the azimuth. The geomagnetic sensor may be implemented as a three-axis geomagnetic sensor which measures magnitude and direction of the magnetism with respect to three axes orthogonal to each other. The north direction as measured at the geomagnetic sensor may be magnetic north. However, even when the geomagnetic sensor measures magnetic north direction, true north direction may be outputted as a result of inner computations.

The sensor 220 may optionally include additional sensor such as a distance sensor. The distance sensor measures distance between the remote controller 200 and the display apparatus 100. Accordingly, the distance sensor may sense distance between position at which the user uses the remote controller 200 and the display apparatus 100.

The input 230 receives user commands.

To be specific, the input 230 may be implemented so as to include at least one of touch sensor and optical Joystick (OJ) sensors utilizing optical technology. For example, user can use the OJ as if he is using buttons, since the OJ can perceive four directions as the user's finger slides upward/downward/leftward/rightward with respect to the OJ. Further, the input 230 may additionally include physical button (e.g., tact switch) to receive user command to select an object at which the pointer is placed in the pointing mode. For example, it is possible to receive user command to select an object in accordance with pressing on the tact switch. That is, when the pointer is implemented as a mouse cursor, mouse click input may be performed according to the pressing on the tact switch.

The controller 240 operates to control overall operation of the remote controller 200. For example, the controller 240 may be implemented as a central processing unit (CPU) or a microcontroller unit (MCU).

The controller 240 may particularly transmit to the display apparatus 100 the information which is sensed in accordance with the movement of the remote controller 200.

For example, it is possible to calculate absolute coordinate values for the controlling on the pointer location by analyzing the sensed values obtained at the sensor 220 and transmit the calculated absolute coordinate values to the display apparatus 100 to control the movement of the pointer. Alternatively, it is possible to transmit the sensed value sensed at the sensor 220 to the display apparatus 100, in which case the absolute coordinate values may be calculated based on the sensed value received at the display apparatus 100, and the pointer movement may be controlled using the calculated absolute coordinate values. To be specific, the user may grab the remote controller 200 and tilt it upward or downward, or rotate to the left or right. The geomagnetic sensor and the accelerometer embedded in the remote controller 200 may calculate the pitch angle ($\theta$), or yaw angle ($\psi$) which are varied in accordance with the user's motion, and transmit such calculated information to the display apparatus 100. It is possible to additionally sense the roll angle ($\phi$).

When a preset event occurs, the controller 240 may control so that the movement information of the remote controller as sensed at the sensor 220 and the location of the reference point of the pointer provided on the user interface screen are mapped at the time the preset event occurs.

The controller 240 may particularly set the reference angle based on the angle information of the remote controller 200 sensed at the sensor 220 at the time the event occurs, and control so that the pointer is placed at the reference point on the user interface screen. The 'preset event' as used herein may be a double tapping on the input 230, or rubbing the input 230 with a finger, but not limited thereto. Further, the reference point may be a center coordinate on the screen, but not limited thereto.

Further, the controller 240 may control so that after the pointer is placed at the reference pointer on the user interface screen, the pointer is fixed thereat for a preset period of time.

Figure 4:
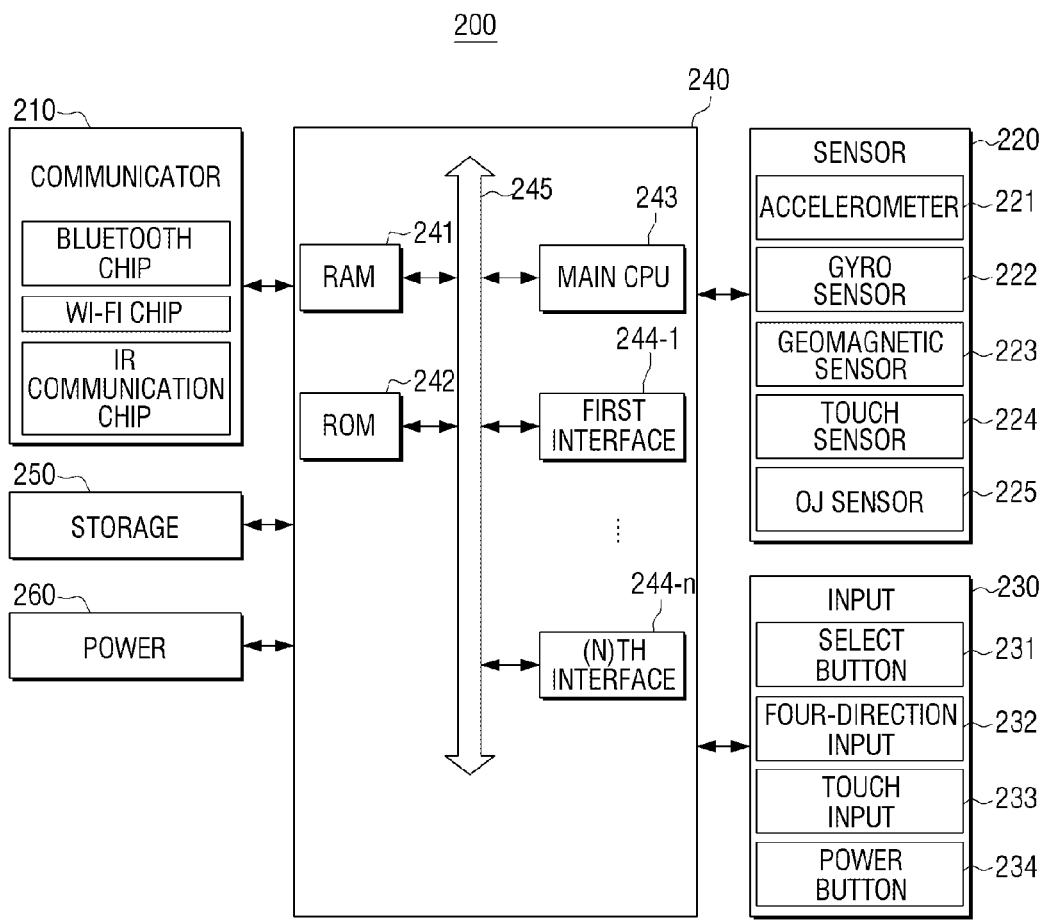
FIG. 4 is a detailed block diagram of a remote controller according to an embodiment.

FIG. 4 is a detailed block diagram of the remote controller of FIG. 3 according to an embodiment. Since FIG. 4 is provided to depict an embodiment, depending on embodiments, those illustrated may be omitted or new ones may be added.

The communicator 210 may include hardware according to a variety of communication methods, such as, Bluetooth chip, Wi-Fi chip or IR communication chip. The chips may be integrated into one single chip, or may be separately provided as illustrated in FIG. 4.

The Bluetooth chip, Wi-Fi chip or IR communication chip respectively perform communication in Bluetooth manner, Wi-Fi manner or IR manner. When Bluetooth chip or Wi-Fi chip is used, information for connection may be transmitted and received in advance, so that connection is established using the transmitted and received information, and then various information may be transmitted or received.

The communicator 210 may perform communication with external devices including the display apparatus 100 using chips of various structures. The communicator 210 may particularly transmit various control signals or control information explained above to the display apparatus 100.

The sensor 220 is provided to sense the movement of the remote controller 200. The sensor 220 may include an accelerometer 221, a gyro sensor 222, a geomagnetic sensor 223, a touch sensor 224, or various others.

The accelerometer 221 measures acceleration and direction of the acceleration when the movement occurs. That is, the accelerometer 221 outputs a sensed value that corresponds to acceleration of the movement of the remote controller 200 to which the sensor is attached, and a sensed value that corresponds to acceleration of gravity that varies depending on skew. The controller 240, using the outputs from the accelerometer 221, may determine the degree of skewing, based on the acceleration of the movement of the remote controller 200 and the acceleration of gravity of the remote controller 200 in motionless state.

When the rotation occurs, the gyro sensor 222 measures Corioli's force that acts in the velocity direction, and senses angular velocity. The controller 240 may also sense the rotation of the remote controller 200 using the measured values of the gyro sensor 222.

The geomagnetic sensor 223 senses magnetism of the earth or magnetism of adjacent magnetic component objects using two- or three-axis fluxgate. The controller 240 may measure the direction and magnitude of magnetism, using the geomagnetic value as sensed at the geomagnetic sensor 223, and calculate azimuth based on the same. Accordingly, it is possible to determine the direction the remote controller 200 is rotated.

The touch sensor 224 may sense touch manipulation of the user. The touch sensor 224 may be capacitive or resistive type. The capacitive touch sensor uses dielectric material coated on the surface of the remote controller 200 to sense microelectric current excited by a user's body touching on the surface of the remote controller 200, to thus calculate touch coordinates. The resistive touch sensor includes two electrode plates embedded in the remote controller 200 so that, when the user touches the remote controller 200, the resistive touch sensor senses electric current that flows as the upper and lower plates at the point of touch contact. Various other sensing manners such as infrared sensing, acoustic surface wave transfer, integral strain gauge, or piezo effect manner may be utilized to sense the touch manipulation. These will not be explained herein in detail for the sake of brevity.

The OJ sensor 225 may be an image sensor that senses user manipulation inputted to the OJ. The OJ sensor 225 may operate in the same manner as the optical mouse is reversed. Accordingly, in response to user's input which may be sliding on the OJ with a finger, the OJ sensor 225 may analyze an optical signal.

The controller 240 may perform various computational operations according to various sense signals provided from the sensor 220. For example, as the accelerometer 221, the gyro sensor 222, or the geomagnetic sensor 223 sense movement of the remote controller 200, the controller 240 may control so that the corresponding sense signals are computed according to signal processing algorithms and the result of the computation is transmitted to the display apparatus 100.

The input 230 includes a select button 231, a four-direction input 232, a touch input 233 and a power button 234. However, depending on embodiments, certain elements may be deleted or new ones may be added.

The select button 231 may receive a select command.

The select button 231 may particularly receive a user command to select an object at which the pointer is placed on the screen of the display apparatus 100. That is, when the select button 231 is pressed in a state that the pointer displayed on the screen of the display apparatus 100 is placed on a specific content, the corresponding object is selected so that corresponding function is executed. For example, when the corresponding content is an icon interface of a specific application, a screen to execute the specific application may be displayed.

Further, the select button 231 may perform the function of an enter key or confirm key, depending on the characteristics of the UI screen as provided.

The four-direction input 232 may be arranged around the select button 231, to receive a user command on four-direction manipulation.

Meanwhile, the select button 231 and the four-direction input 232 may include at least one of the touch sensor and optical Joystick utilizing optical technology.

The touch input 233 may include a plurality of touch regions mapped with different functions. That is, the touch input 233 may include a plurality of touch regions mapped with different functions such as channel change, volume adjustment or menu.

The power button 235 may receive a user command to turn on or off the power.

Additionally, a mode shift button (not illustrated) may be provided to receive a user command to shift from a pointing mode to gesture mode, particularly when the remote controller 200 supports the two control modes, i.e., pointing mode and gesture mode. The 'gesture mode' as used herein is a mode to control the display apparatus 100 in accordance with pre-defined gesture of the remote controller 200. For example, UI screen may change in response to a control signal that corresponds to a gesture that flicks from left to right, and content zoom-in/out may be performed in response to a control signal that corresponds to a gesture that moves upward and downward.

That is, as long as the mode shift button (not illustrated) is pressed, the remote controller 200 operates in gesture mode. The remote controller 200 may then operate in pointing mode as the pressing is ceased. The mode shift button (not illustrated) may be implemented in a hardware button form.

Meanwhile, the operation of the controller 240 explained above may be implemented according to a program stored in a storage (not illustrated).

That is, the storage (not illustrated) may store operating system (O/S) to drive the remote controller 200, a signal processing algorithm to perform computation on the sense signal obtained at the sensor 220, or various other data. The controller 240 may control the overall operation of the remote controller 200 using various programs stored in the storage (not illustrated).

To be specific, the controller 240 may include a RAM 241, a ROM 242, a main CPU 243, first to (n)th interfaces (244-1~244-n).

The RAM 241, ROM 242, main CPU 243, first to (n)th interfaces (244-1~244-n) may be connected to each other via bus 245, to receive or transmit data or signals.

The first to (n)th interfaces (244-1~244-n) may be connected to not only the components illustrated in FIG. 4, but also the other various components, to thus allow access by the main CPU 243.

The main CPU 243 accesses the storage (not illustrated) and perform booting using the O/S stored in the storage (not illustrated). The main CPU 243 then performs various operations using the programs or data stored in the storage (not illustrated).

Specifically, the ROM 242 may store a command set for system booting. When the power is supplied in response to turn-on command, the main CPU 243 copies the O/S stored in the storage (not illustrate) onto the RAM 241 according to a command stored in the ROM 242 and executes the O/S to thus boot up the system. When the booting finishes, the main CPU 243 copies the programs stored in the storage (not illustrated) onto the RAM 241 and executes the programs copied on the RAM 241 to thus perform corresponding operations.

Accordingly, the controller 240 may copy the programs stored in the storage (not illustrated), and execute the same to perform various operations.

Figure 5:
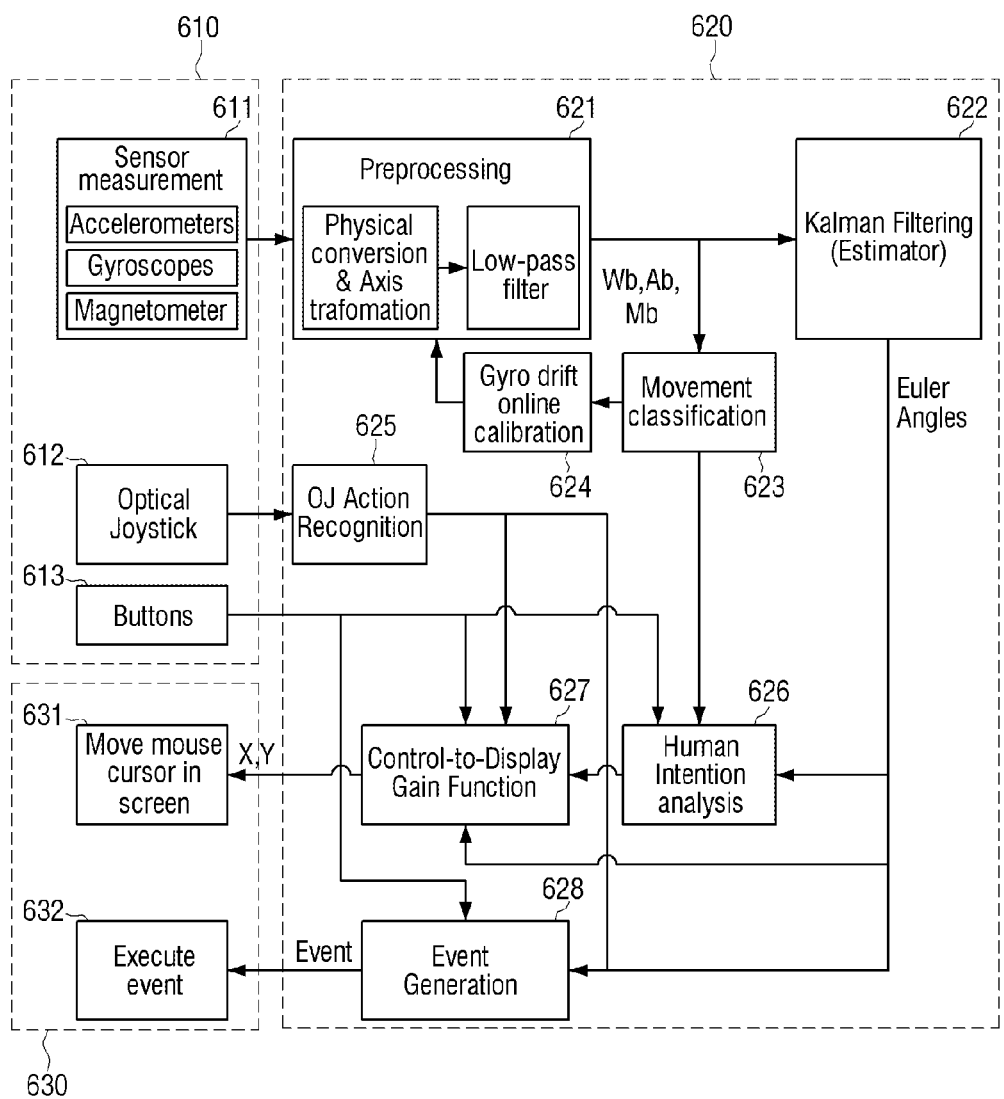
FIG. 5 is a block diagram provided to explain a method of data processing according to an embodiment.

FIG. 5 is a block diagram provided to explain a method for processing data, according to an embodiment.

Referring to FIG. 5, the method for processing data according to an embodiment may be performed by a data input 610, a data processor 620 and a result processor 630.

The data input 610 includes a sensor 611, an OJ 612 and a button 613. The above may be substantially implemented in the remote controller 100.

The sensor 611 may include a three-axis accelerometer to measure acceleration of linear movement with respect to three axes orthogonal to each other, a three-axis gyro sensor to measure velocity of rotation angle with respect to three axes orthogonal to each other, and a three-axis geomagnetic sensor to measure magnitude and direction of magnetism with respect to three axes orthogonal to each other. The three-axis geomagnetic sensor is generally used to estimate azimuth of the earth. Specifically, the three-axis geomagnetic sensor measures magnetic field of the earth and calculates the azimuth. The accelerometer, the gyro sensor and the geomagnetic sensor may be configured so that one component measures all the three axes, or one component may measure one or two axes only. Further, one component may include two or more different types of sensors among the accelerometer, gyro sensor and geomagnetic sensor. The sense signal measured at the accelerometer, the gyro sensor and the geomagnetic sensor embedded in the remote controller 200 may be transmitted to the data processor.

The button 612 may include one or more buttons (or switches) to receive user input. The buttons may be physical buttons, or a component to receive user input in a form other than physical form, such as touch. The user may set initial reference position or reference angle with a specific button of the button 612.

The OJ 613 may include an optical Joystick, which may operate in a manner as if an optical mouse is reversed. Accordingly, when a user slides on the OJ with his finger, the image sensor in the OJ analyzes the optical signal and outputs movement data.

In one embodiment, the button 612 and the OJ 613 may be provided separately, but not limited thereto. Accordingly, the OJ 613 and the button 612 may be formed otherwise.

The data processor 620 may include a pre-processor block 1 (621), a posture estimation block 2 (622), a movement identification block 3 (623), a calibration block 4 (624), an OJ recognition block 5 (625), a user intention analysis block 6 (626), a gain function implementation block 7 (627), and an event generation block 8 (628). The operation of the data processor 620 may be performed at the remote controller 200 or at the display apparatus 100. Depending on embodiment, some may be performed at the remote controller 200, while the other may be performed at the display apparatus 100. Further, the operations may be performed at the CPU or the MCU.

The block 1 (621) operates to pre-process the sensed value received from the sensor 611, and specifically performs operation including physical quantity conversion, sensor axis transform and low-pass filtering with respect to the sensed value. For example, the operation may include:

Physical quantity transform: the sensed value, which is analog, is transformed into digital value as it passes through the sensor or analog-digital converter (ADC) embedded in the MCU. The digitized sensed value is then converted into actual physical quantity to be used in the algorithm processing. Although not essentially required, the conversion into actual physical quantity may allow easier utilization of sensed value during algorithm processing. The unit of physical quantity of the accelerometer is generally m/sec$^2$ or g (gravity), and the unit of physical quantity of the gyro sensor is generally rad/sec or deg/sec, and the unit of physical quantity of the geomagnetic sensor is T (Tesla) or G (Gauss). The unit of physical quantity may change depending on algorithms. The digitized sensed value is converted into actual physical quantity which is applicable for the signal process algorithm.

Sensor axis transform: individual axes of the accelerometer, gyro sensor and geomagnetic sensor may be transformed into one defined axis. For example, referring to FIG. 1, the axes (Xb-Yb-Zb) of the remote controller 200 may be set as reference axis.

Low-pass filter: the low-pass filter may remove electric noise of the sensor and unintended high frequency movement. It is possible to use the internal components of the sensor or digital filter in the MCU.

The block 2 (622) estimates pose or Euler angle (roll, pitch, yaw (heading)) based on the respective sensed values. The estimation by Kalman filter may be applied.

The block 3 (623) identifies movement state using the sensed signal, by determining if the remote controller 200 is not moving, or moving slowly or fast.

The block 4 (624) performs calibration and when the block 3 (623) determines zero-rate, i.e., that the remote controller 200 is not moving, obtains an average of the output values of the gyro sensor for a predetermined period of time, and subtracts the value from the output value of the gyro sensor to compensate for the offset of the gyro sensor on-line.

The block 5 (625) determines if the operation is a pre-defined one, using the data outputted from the OJ 612. When the pre-defined operation is the one to set a reference point, the block 5 (625) sets the pitch angle (θ), and yaw angle (ψ) at such time as reference angles θr, ψr, respectively. The operation to set reference point may be a double tapping or rubbing on OJ upward and downward or leftward and rightward.

The block 6 (626) operates to analyze and identify the intension of the user is to move the remote controller 200, to stop it, to do a pre-defined gesture or to click. The 'pre-defined gesture' may be distinguished from the general way of moving pointer explained above.

The block 7 (627) converts the pitch angle (θ), yaw angle (ψ) outputted from the block 2 (622) into X, Y coordinates of the display apparatus 100, using the following mathematical expression, and designate the location of the pointer, i.e., mouse cursor using the converted coordinates.

$$X=G_x(\theta-\theta_r)+W_d/2, Y=G_y(\psi-\psi_r)+H_d/2 \quad \text{[Mathematical Expression 1]}$$

where, Gx and Gy denote gains that convert the angles into locations, r and r are pitch angle (θ), yaw angle (ψ) at the time of setting reference point, Wd and Hd are width and height of the coordinates of the display apparatus, respectively. Further, the coordinates (X, Y) meets $0 \leq X \leq Wd$, $0 \leq Y \leq Hd$. Using the converted coordinates, the location of the pointer is designated. After that, the X, Y coordinates outputted from the block 7 (727) may be mapped with X, Y coordinates of the pointer on the UI screen of the display apparatus 100, so that the coordinates of the pointer are designated.

The block 8 operates to generate an event based on the results outputted from the blocks 5, 6 and the button 613. The event may be generated from the block 5 in response to an action that rubs the OJ 612 to one of upward, downward, leftward, and rightward directions, or from the block 6 in response to recognition of the gesture.

Meanwhile, the result processor 630 includes a cursor processor 631 and an event performer 632. The cursor processor 631 maps the absolute coordinates received from the block 7 (627) with mouse cursor coordinates (X, Y) of the display apparatus. The event performer 632 may perform the event received from the block 8 (6285) at the display apparatus.

Figure 6:
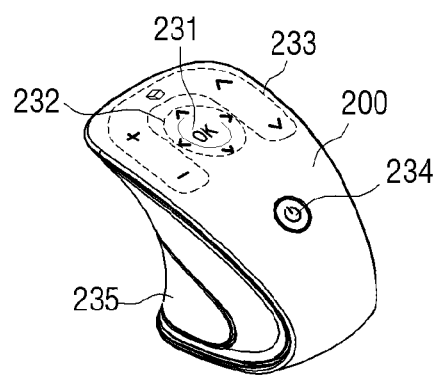
FIG. 6 illustrates a remote controller according to an embodiment.
Figure 6:
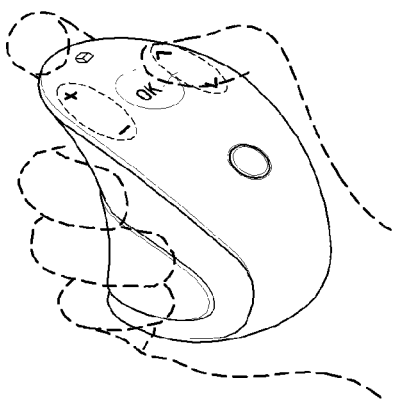
Figure 6:
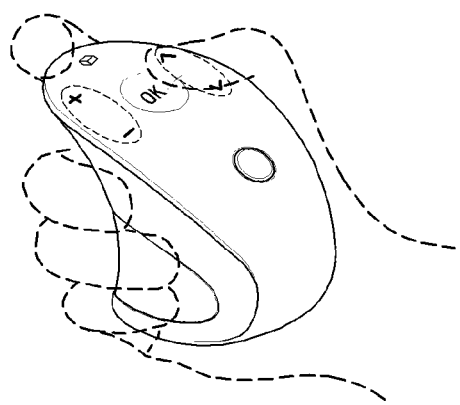

FIG. 6 illustrates a remote controller 200 according to an embodiment.

Referring to FIG. 6(a), the select button 231 may be formed on a front of the remote controller 200. Additionally, the four-direction input 242, the touch input 243 and the power button 234 may also be provided on the front. The touch input 243 may include a plurality of touch regions mapped with different functions such as channel adjustment region, volume adjustment region or menu region. Further, when the remote controller 200 is implemented in a form to provide the plurality of control modes explained above, a mode shift button 235 may additionally be provided on a portion of the rear surface of the remote controller 200 that the user grips.

Referring to FIG. 6(b), the user may select a pointing mode by ceasing pressing the mode shift button 235. Accordingly, when the remote controller 200 is in the pointing mode, the UI screen provided by the display apparatus 100 may display a pointer in a pointing form as illustrated in the drawing.

Referring to FIG. 6(c), it is possible to select a gesture mode by gripping, in which the user keeps pressing the mode shift button 235.

Figure 7:
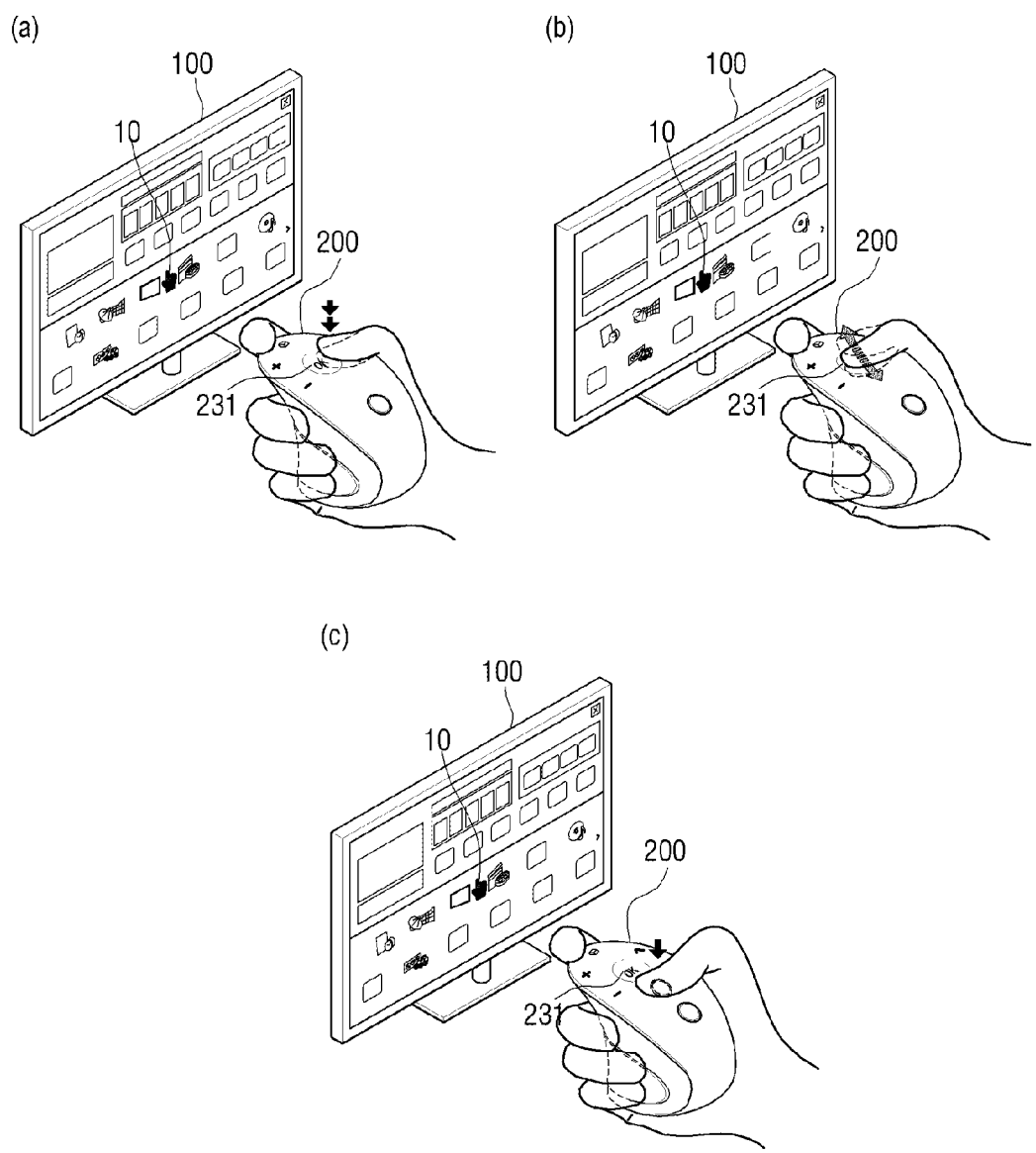
FIG. 7 is a view provided to explain a method for setting a reference point, according to an embodiment.

FIG. 7 is a view provided to explain a method for setting a reference point, according to an embodiment.

Referring to FIG. 7(a), the user may input user command to set a reference point by double tapping the input of the remote controller 200. The input may be implemented as the select button 231 explained above, but not limited thereto. That is, the input may be implemented so as to include at least one of the touch sensor and OJ sensor utilizing optical technology. Further, the input may additionally include a physical button (e.g., tact switch) to receive a user command to select an object at which a pointer is placed in the pointing mode).

Alternatively, referring to FIG. 7(b), the user may input a user command to set a reference point by rubbing the input of the remote controller 200.

Alternatively, referring to FIG. 7(c), the user may input a user command to set a reference point, using the button 236 provided separately on the remote controller 200 to set a reference point. The button 236 may be implemented as a physical button (e.g., tact switch).

Figure 8:
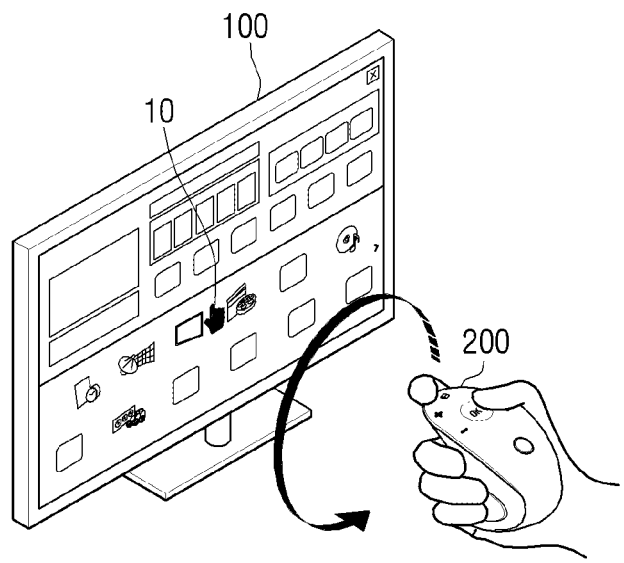
FIG. 8 is a view provided to explain a method for setting a reference point according to another embodiment.
Figure 8:
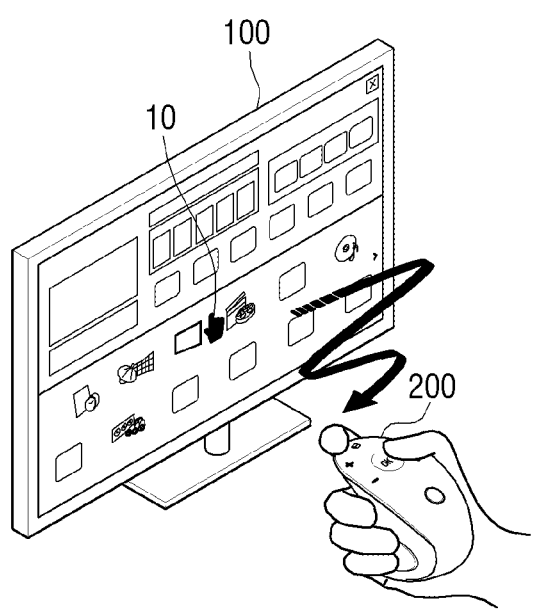

FIG. 8 is a view provided to explain a method for setting a reference point, according to another embodiment.

Referring to FIGS. 8(a) and 8(b), the user may input a user command to set a reference point by inputting a gesture predefined at the remote controller 200. For example, referring to FIG. 8(a), the user may input a user command to set a reference point by making a gesture of drawing a circle with the remote controller 200, in which case the remote controller 200 may perceive the corresponding gesture (i.e., drawing a circle) and transmits a corresponding signal to the display apparatus 100.

Further, referring to FIG. 8(b), the user may input a user command to set a reference point, by making a gesture of drawing a zigzag pattern with the remote controller 200. Besides the embodiments illustrated in FIGS. 8(a) and 8(b), gestures for setting reference point may be implemented in various embodiments.

Figure 9:
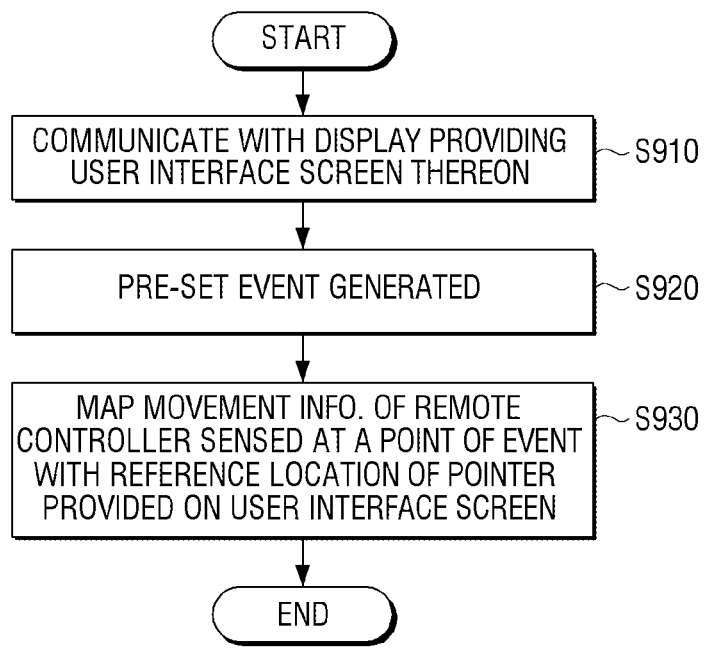
FIG. 9 is a flowchart provided to explain a control method of a remote controller according to an embodiment.

FIG. 9 is a flowchart provided to explain a control method of a remote controller, according to an embodiment.

According to the control method of the remote controller illustrated in FIG. 9, at S910, communication is performed with a display apparatus that provides a user interface screen.

At S920, when a preset event occurs, at S930, it is controlled so that the movement information of the remote controller at the time the event occurs is mapped with the reference point of the pointer provided on the user interface screen.

To be specific, operation at S930 may control so that the angle information of the remote controller as sensed at the sensor at the time of event is set to a reference angle, and the pointer is placed at the reference point on the user interface screen. The pointer may be the kind of pointer that is provided in the absolute coordinate-based manner.

Further, at S930, it may also be controlled so that after the pointer is placed on the reference point on the user interface screen, the pointer is fixed thereat for a predetermined period of time.

The 'preset event' as used herein may be a pre-defined gesture of the remote controller.

Further, the 'preset even' as used herein may be double tapping or rubbing the button provided on the remote controller, in which case the button may include at least one of the touch sensor and optical Joystick (OJ) sensor utilizing optical technology.

The button may additionally include a physical button to receive a user command to select an object at which the pointer is placed in the pointing mode.

Further, at S930, at least one of the accelerometer, gyro sensor and geomagnetic sensor may be used to sense the movement of the remote controller.

Figure 10:
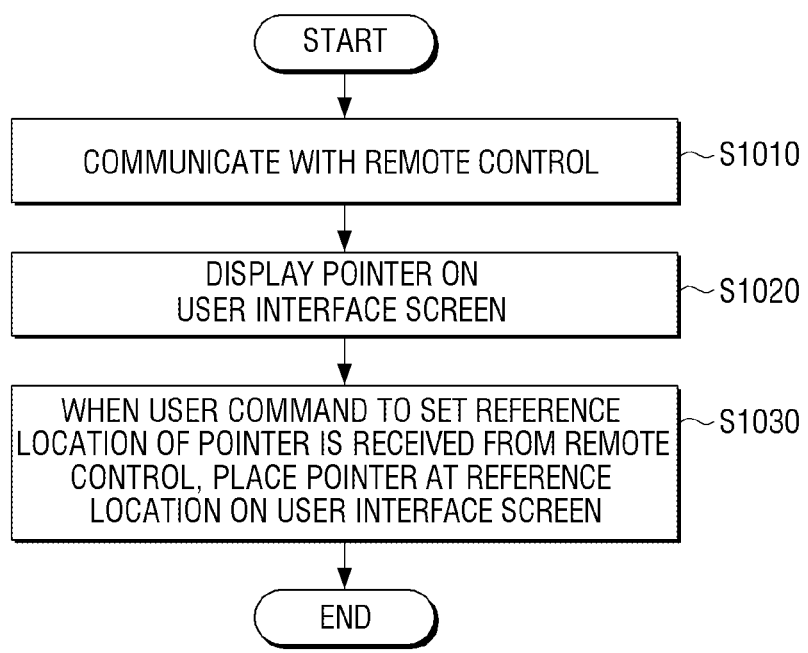
FIG. 10 is a flowchart provided to explain a control method of a display apparatus controlled by a remote controller, according to an embodiment.

FIG. 10 is a flowchart provided to explain a control method of a display apparatus controlled by the remote controller, according to an embodiment.

Referring to FIG. 10, at S1010, the display apparatus communicates with the remote controller.

At S1020, a pointer to perform indicating function is displayed on a user interface screen.

After that, when a user command to set a reference point of the pointer is received from the remote controller, at S1030, it is controlled so that the pointer is placed on the reference pointer on the user interface screen. For example, it may be controlled so that the pointer is placed on the center coordinate on the user interface screen. It is thus possible to set a reference point of the pointer in the absolute pointing manner in which the absolute coordinates are estimated using the values sensed in accordance with the movement of the remote controller.

According to various embodiments, it is possible to set a reference point of absolute coordinates in the pointing mode without requiring additional buttons. As a result, user convenience increases.

Meanwhile, methods according to various embodiments may be implemented by simply upgrading software of related display devices or user terminals.

Further, a non-transitory computer readable medium may be provided, storing therein a program to sequentially execute the control method according to various embodiments.

The 'non-transitory computer readable medium' refers to medium which stores data semi-permanently and can be read by devices, rather than a medium storing data temporarily such as register, cache, or memory. Specifically, the above various applications or programs may be stored and provided in non-transitory computer readable medium such as CD, DVD, hard disk, Blu-ray disk, USB, memory card, or ROM.

Further, although bus is not specifically illustrated in the drawings of the display apparatus and the remote controller appended hereto, communication among the respective components of the display apparatus and the remote controller may be performed via the bus. Further, each device may additionally include a processor such as CPU or microprocessor to perform the respective operations explained above.

Further, the foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A remote controller for controlling a pointer provided on a user interface screen of a display apparatus in an absolute pointing manner, comprising:
    a communicator configured to perform communication with the display apparatus;
    a sensor configured to sense a movement of the remote controller; and
    a controller configured to control so that, when a preset event occurs, angle information of the remote controller as sensed at the sensor at a time when the event occurs is set as reference angle information, and to place the pointer on a reference point of the user interface screen,
    wherein the controller controls so that once the pointer is moved from a position of the pointer to the reference point on the user interface screen at the time the event occurs, the pointer is fixed on the reference point for a preset period of time.

2. The remote controller of claim 1, wherein the event is a pre-defined gesture of the remote controller.

3. The remote controller of claim 1, further comprising a button, wherein the event comprises a double tap or a rubbing on the button.

4. The remote controller of claim 3, wherein the button is configured in such a form that the button comprises at least one of a touch sensor and an optical Joystick which utilizes optical technology.

5. The remote controller of claim 4, wherein the button further comprises a physical button configured to receive a user command to select an object at which the pointer is placed in the pointing mode.

6. The remote controller of claim 1, wherein the sensor comprises at least one of an accelerometer, a gyro sensor and a geomagnetic sensor.

7. The remote controller of claim 1, wherein the pointer is provided in an absolute pointing manner in which absolute coordinate is estimated based on the movement of the remote controller.

8. The remote controller of claim 1, wherein the controller, when motion of the remote controller is sensed at the sensor after the pointer is placed on the reference point, calculates a position where the pointer moves to based on the reference angle and an angle of the remote controller and transmits information regarding the calculated position to the display apparatus so that the pointer is moved to the calculated position.

9. A display apparatus controlled by a remote controller for controlling a pointer provided on a user interface screen of the display apparatus in an absolute pointing manner, the display apparatus comprising:
    a communicator configured to communicate with the remote controller;
    a display configured to display the pointer which provides an indicating function on the user interface screen; and
    a controller configured to control so that when a user command to set a reference point of the pointer is received from the remote controller, the pointer is placed on the reference point on the user interface screen,
    wherein the controller controls so that once the pointer is moved from a position of the pointer to the reference point on the user interface screen at the time the event occurs, the pointer is fixed on the reference point for a preset period of time.

10. A control method of a remote controller for controlling a pointer provided on a user interface screen of a display apparatus in an absolute pointing manner, comprising:
    performing communication with the display apparatus; and
    when a preset event occurs, controlling so that angle information of the remote controller as sensed at a sensor at a time when the event occurs is set as reference angle information, and to place the pointer on a reference point of the user interface screen,
    wherein the controlling comprises controlling so that once the pointer is moved from a position of the pointer to the reference point on the user interface screen at the time the event occurs, the pointer is fixed on the reference point for a preset period of time.

11. The control method of claim 10, wherein the event is a pre-defined gesture of the remote controller.

12. The control method of claim 10, wherein the event comprises a double tap or a rubbing on a button provided on the remote controller.

13. The control method of claim 12, wherein the button is configured in such a form that the button comprises at least one of a touch sensor and an optical Joystick which utilizes optical technology.

14. The control method of claim 13, wherein the button further comprises a physical button configured to receive a user command to select an object at which the pointer is placed in the pointing mode.

15. The control method of claim 10, wherein the controlling comprises sensing the movement of the remote controller using at least one of an accelerometer, a gyro sensor and a geomagnetic sensor.

16. The control method of claim 10, wherein the pointer is provided in an absolute pointing manner in which absolute coordinate is estimated based on the movement of the remote controller.

17. A control method of a display apparatus controlled by a remote controller for controlling a pointer provided on a user interface screen of the display apparatus in an absolute pointing manner, the control method comprising:
    displaying the pointer which provides an indicating function on the user interface screen; and
    controlling so that when a user command to set a reference point of the pointer is received from the remote controller, the pointer is placed on the reference point on the user interface screen, wherein the controlling comprises controlling so that once the pointer is moved from a position of the pointer to the reference point on the user interface screen at the time the event occurs, the pointer is fixed on the reference point for a preset period of time.

\* \* \* \* \*